United States Patent
Feldmeier et al.

(10) Patent No.: US 7,287,940 B2
(45) Date of Patent: Oct. 30, 2007

(54) DEVICE FOR FIXING A TOOL ON A SHAFT AND MACHINE SPINDLE COMPRISING SAME

(75) Inventors: Fritz Feldmeier, Nürnberg (DE); Bernd Möller, Hersbruck (DE)

(73) Assignee: Paul Müller GmbH & Co. K.G. Unternehmensbeteiligungen, Nürnberg (DE)

( * ) Notice: Subject to any disclaimer, the term of this patent is extended or adjusted under 35 U.S.C. 154(b) by 0 days.

(21) Appl. No.: 10/498,153

(22) PCT Filed: Dec. 6, 2002

(86) PCT No.: PCT/DE02/04483

§ 371 (c)(1),
(2), (4) Date: Feb. 11, 2005

(87) PCT Pub. No.: WO03/049898

PCT Pub. Date: Jun. 19, 2003

(65) Prior Publication Data

US 2005/0141976 A1    Jun. 30, 2005

(30) Foreign Application Priority Data

Feb. 11, 2001 (DE) .............................. 101 60 705

(51) Int. Cl.
B23C 5/26 (2006.01)
(52) U.S. Cl. .................. 409/233; 408/239 R
(58) Field of Classification Search ........ 409/231–233; 408/239 R, 239 A; 82/158, 160
See application file for complete search history.

(56) References Cited

U.S. PATENT DOCUMENTS

| 3,520,228 | A | * | 7/1970 | Wohlfeil | 409/233 |
| 4,131,054 | A | * | 12/1978 | Johnson et al. | 409/233 |
| 4,347,753 | A | * | 9/1982 | Claussen et al. | 409/233 |
| 4,413,938 | A |   | 11/1983 | Kuczenski |  |
| 4,648,172 | A | * | 3/1987 | Geiger et al. | 483/36 |
| 4,677,719 | A | * | 7/1987 | Link | 409/233 |
| 4,708,040 | A | * | 11/1987 | Erickson | 82/160 |
| 5,346,344 | A | * | 9/1994 | Kress et al. | 408/239 R |
| 5,827,021 | A | * | 10/1998 | Klement | 409/233 |
| 6,234,731 | B1 | * | 5/2001 | Sakamoto | 409/233 |
| 2005/0196247 | A1 | * | 9/2005 | Dawidziak et al. | 409/233 |

FOREIGN PATENT DOCUMENTS

| DE | 17 63 139 | 11/1971 |
| DE | 27 58 858 | 8/1978 |
| DE | 35 09 635 | 2/1986 |

* cited by examiner

Primary Examiner—Erica Cadugan
(74) Attorney, Agent, or Firm—Collard & Roe, P.C.

(57) ABSTRACT

The invention concerns a device (1) for fixing a tool on a shaft (2), comprising a drawbar (3) which can slide axially inside the shaft (2) and which is used to releasably lock tools fixed on the shaft (2), in particular for automatically changing tools in automatic machine-tools. The drawbar (3) is housed in the shaft locked in rotation and has an external thread (4) whereon is urged to be pressed a threaded body (2) having a corresponding internal thread (6). The drawbar (3) is so arranged as to be able to slide in the shaft (2), by rotation of the threaded body (5), to enable change of tools.

16 Claims, 6 Drawing Sheets

DEVICE FOR FIXING A TOOL ON A SHAFT AND MACHINE SPINDLE COMPRISING SAME

CROSS REFERENCE TO RELATED APPLICATIONS

Figure 1:
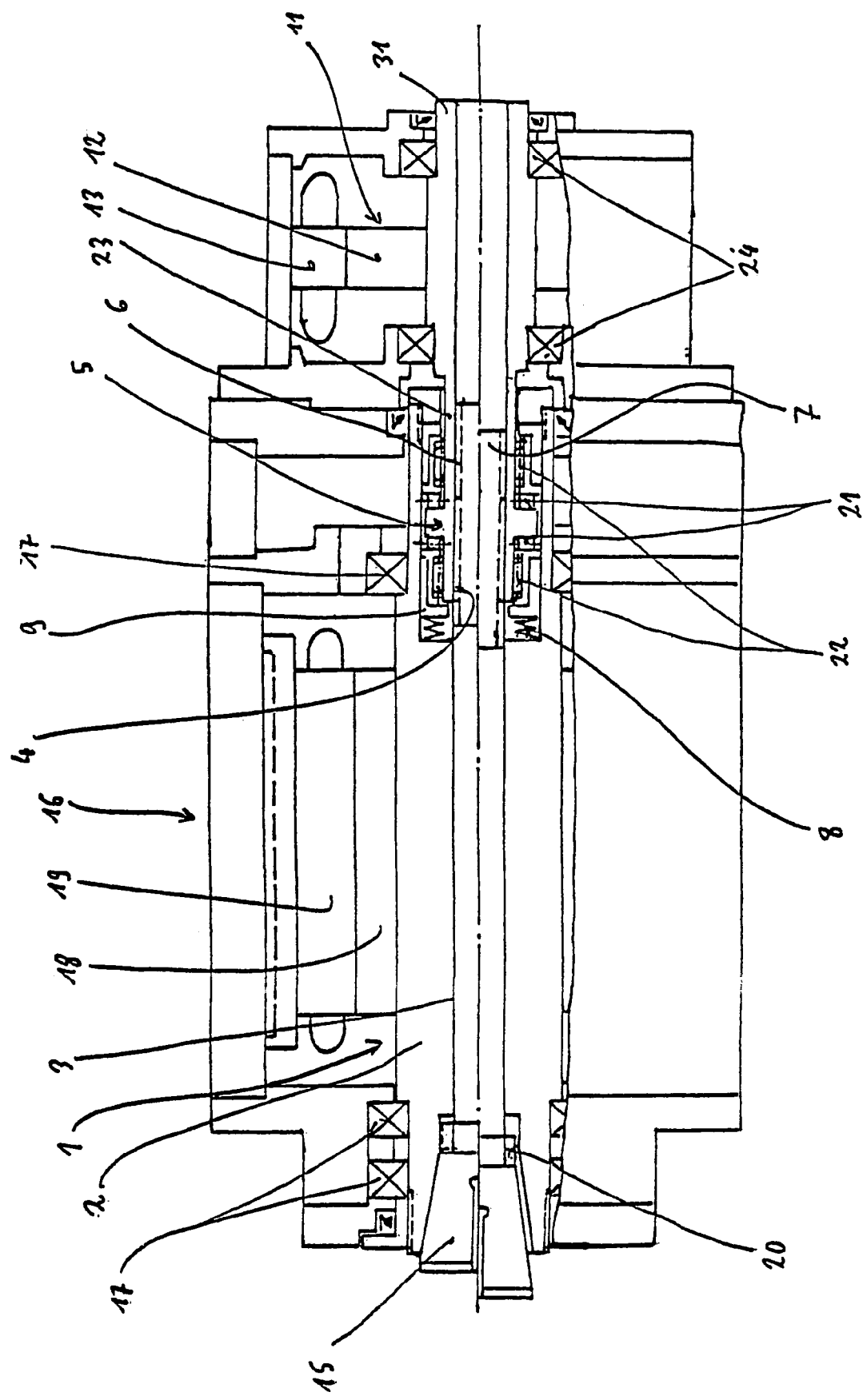

Applicant claims priority under 35 U.S.C. §119 of German Application No. 101 60 705.9 filed on Dec. 11, 2001. Applicant also claims priority under 35 U.S.C. §365 of PCT/DE02/04483 filed on Dec. 6, 2002. The international application under PCT article 21 (2) was not published in English.

The invention relates to a device for fastening a tool to a shaft [having the features of the preamble of claim 1]. The invention also relates to a machine spindle having a device for fastening a tool to a shaft.

The object of the invention is to provide a device for fastening a tool to a shaft, in which device the tool can be fastened to the shaft and released again from the latter in an especially reliable manner. Furthermore, a machine spindle having a device for fastening a tool to a shaft is to be provided in which a tool change can be carried out in an especially reliable manner.

In a device according to the invention for fastening a tool to a shaft, if said device has a drawbar known per se which is axially displaceable in the shaft and is intended for releasably locking tools fastened to the shaft, in particular for the automatic tool change in automatic machine tools (e.g. grinding or milling machines having machine spindles), the tool accommodated in the respective machine can be accommodated quickly and reliably and can be released within the shortest time and exchanged for a new tool. In the process, the drawbar is displaced into an extended axial outer position, in which the tool can be unlocked and removed and a new tool can be inserted. After that, the drawbar returns again in the axial direction into the hollow shaft and locks the inserted new tool.

According to the invention, such a drawbar is accommodated in the shaft of the device in a rotationally locked manner and has an external thread, a threaded body having a corresponding internal thread (e.g. a nut) being provided on the external thread. By rotation of the threaded body relative to the drawbar accommodated in a rotationally locked manner, the drawbar is displaced axially inside the threaded body accommodated in a fixed position in its axial direction in the device, so that the desired axial movement of the drawbar for the tool change is effected.

The drawbar advantageously has an extension for providing the external thread. The threaded body can thus also be attached with its bearing elements in the end region of the drawbar.

By means of a spring element for applying pressure to the drawbar in the axial direction, the drawbar and the tool accommodated in the chuck of the drawbar can be locked in an especially reliable manner, since, even when vibrations and intermittent loads occur, constant axial preloading of the drawbar and thus reliable locking of the tool accommodated are achieved.

The threaded body is accommodated in the device in a stable position in particular in the axial direction via an axial and a radial bearing arrangement. When the threaded body is rotated, it remains in a stable position inside the device, and the desired axial movement of the drawbar inside the threaded body occurs by interaction between the internal thread of the threaded body and the external thread of the drawbar.

The spring element described advantageously acts in particular on the threaded body. This can be realized in terms of design by the threaded body being accommodated with its axial and radial bearing arrangement in a threaded bush which is axially displaceable and to which pressure is applied by the spring element. When pressure is applied by the spring element, the threaded body cannot be axially displaced inside the threaded bush. The rotatability of the threaded body remains ensured.

In a further advantageous embodiment, the threaded body also has an external thread which is accommodated in a corresponding internal thread of the device. Thus rotation of the threaded body is achieved by rotation of the internal thread of the device, and this rotation of the threaded body is in turn transmitted by its internal thread—as already described—to the drawbar and initiates the axial displacement of the latter. Overall, therefore, a differential thread is obtained between the internal thread of the device and the threaded body, which has an external thread and an internal thread. By selecting different pitches of the thread pairings—external thread of the drawbar/internal thread of the threaded body and external thread of the threaded body/internal thread of the device, a desired transmission can be selected according to requirements. Thus a transmission ratio can be selected which already achieves the desired axial displacement of the drawbar by a small number of revolutions of the internal thread. Furthermore, a power-saving transmission ratio may be selected, a plurality of thread revolutions of the internal thread of the device being permitted. All the threads are in particular self-locking and can thus absorb axial forces which act on the drawbar.

The threaded body can in particular be rotated in a motor-operated manner, so that an automatic tool change can take place by an axial displacement of the drawbar. Provided in particular for this purpose is a motor element which may have a rotor attached to an extension of the threaded body. During an axial displacement of the threaded body (as occurs in the case of the differential thread described), the rotor is thus also axially displaced. Advantageously assigned to the rotor is a stator via which the rotor can also be activated in different axial positions.

Such a motor element may be coupled to the threaded body of the device via a fixed coupling or via a clutch.

If the device described is accommodated in a machine spindle, the desired axial displacement of the drawbar for releasing or fastening an accommodated tool in the device can be achieved by motor-operated rotation of the threaded body. The device according to the invention can thus be used in particular for automatic machine tools in machining processes having a multiplicity of tool changes to be carried out automatically.

In an especially advantageous embodiment, when using the device described in a machine spindle, the drive of the machine spindle can also be used for rotating the threaded body (or for actuating the internal thread of the device if there is a differential thread). The drive of the machine spindle therefore has a double function and serves, on the one hand, to drive the shaft for producing the rotary movement of the tool accommodated in the shaft and, on the other hand, during the tool change, as a power source for directly/indirectly rotating the threaded body and for producing the desired axial displacement of the drawbar.

During the described actuation of the threaded body by means of a separate motor element, it is to be ensured that both the drawbar and the shaft are locked against rotation. To this end, the shaft may have an anti-rotation lock, e.g. in form of a female spline having a male spline which can be pushed into position.

Furthermore, in the case of a position-controlled spindle drive, the shaft can be held in its position in a rotationally locked manner by the spindle motor itself.

Figure 2:
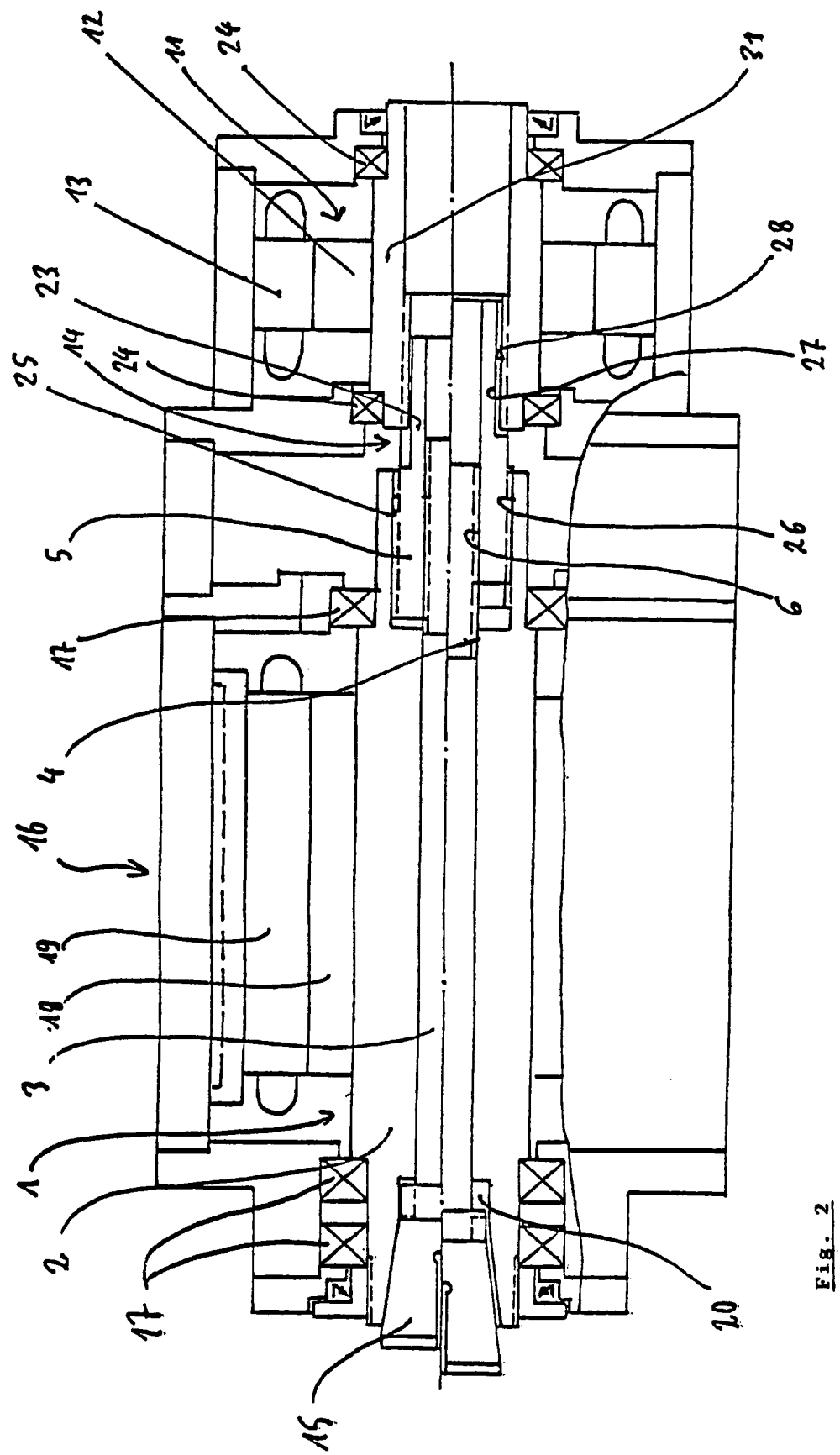
Figure 3:
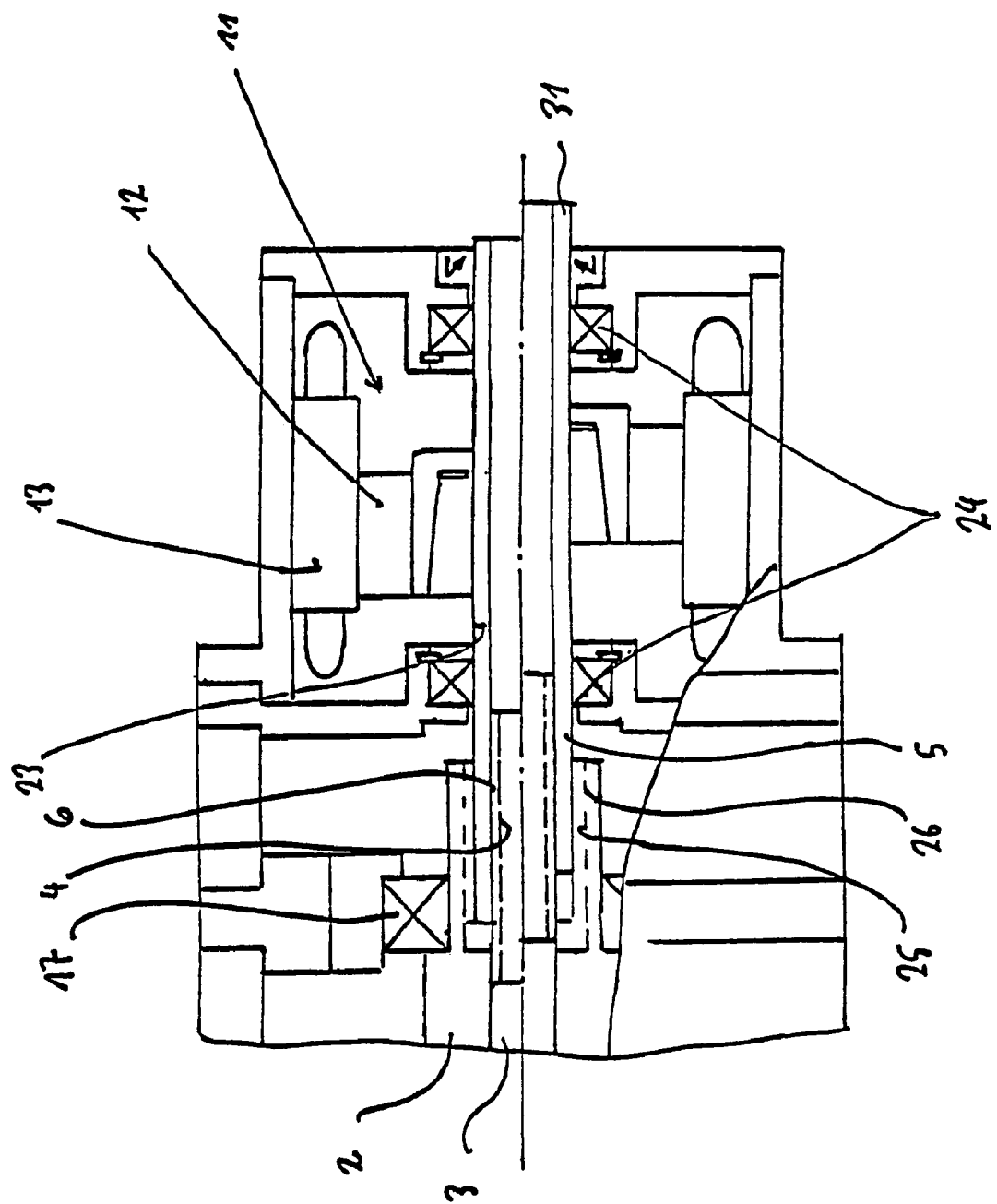
Figure 4:
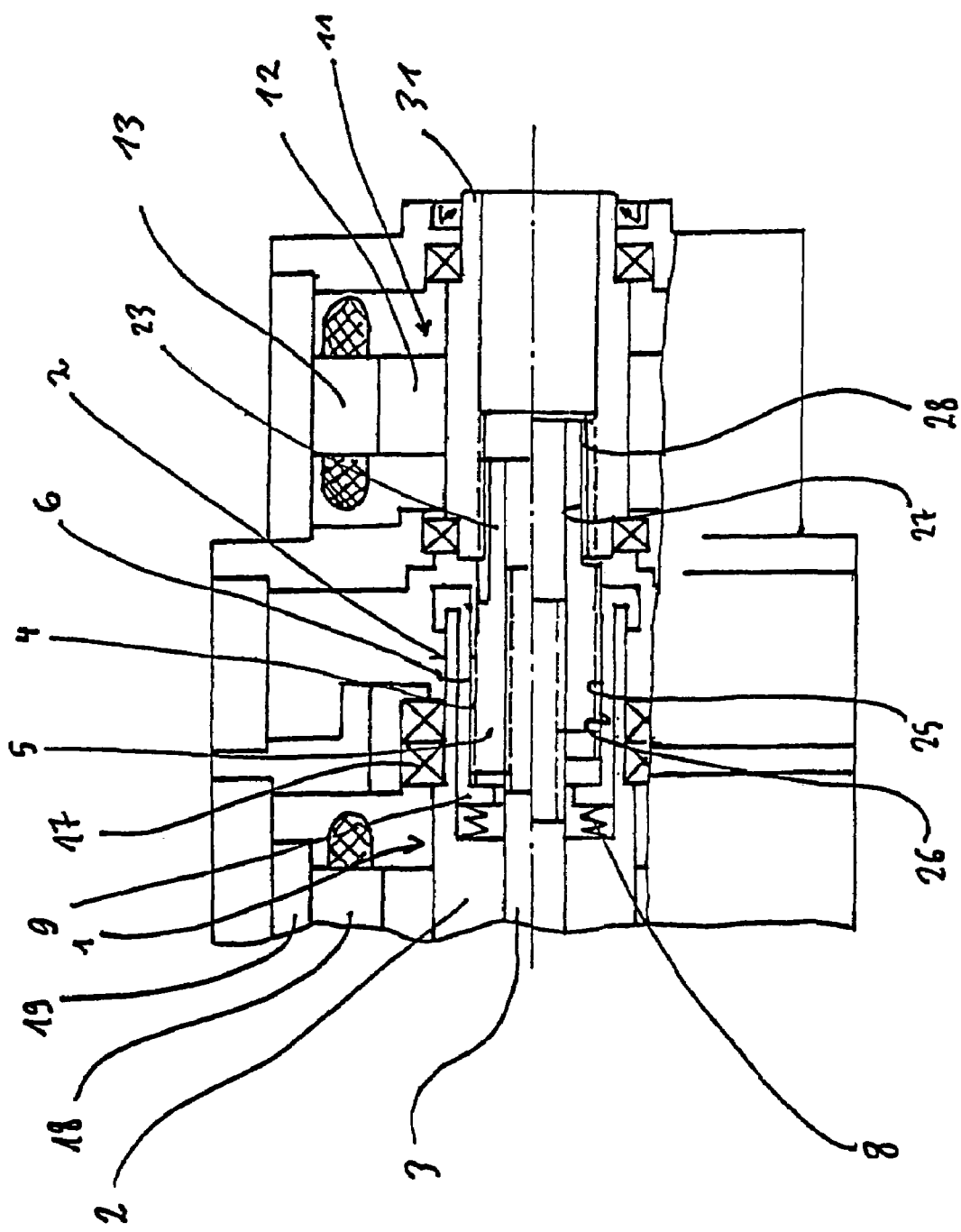
Figure 5:
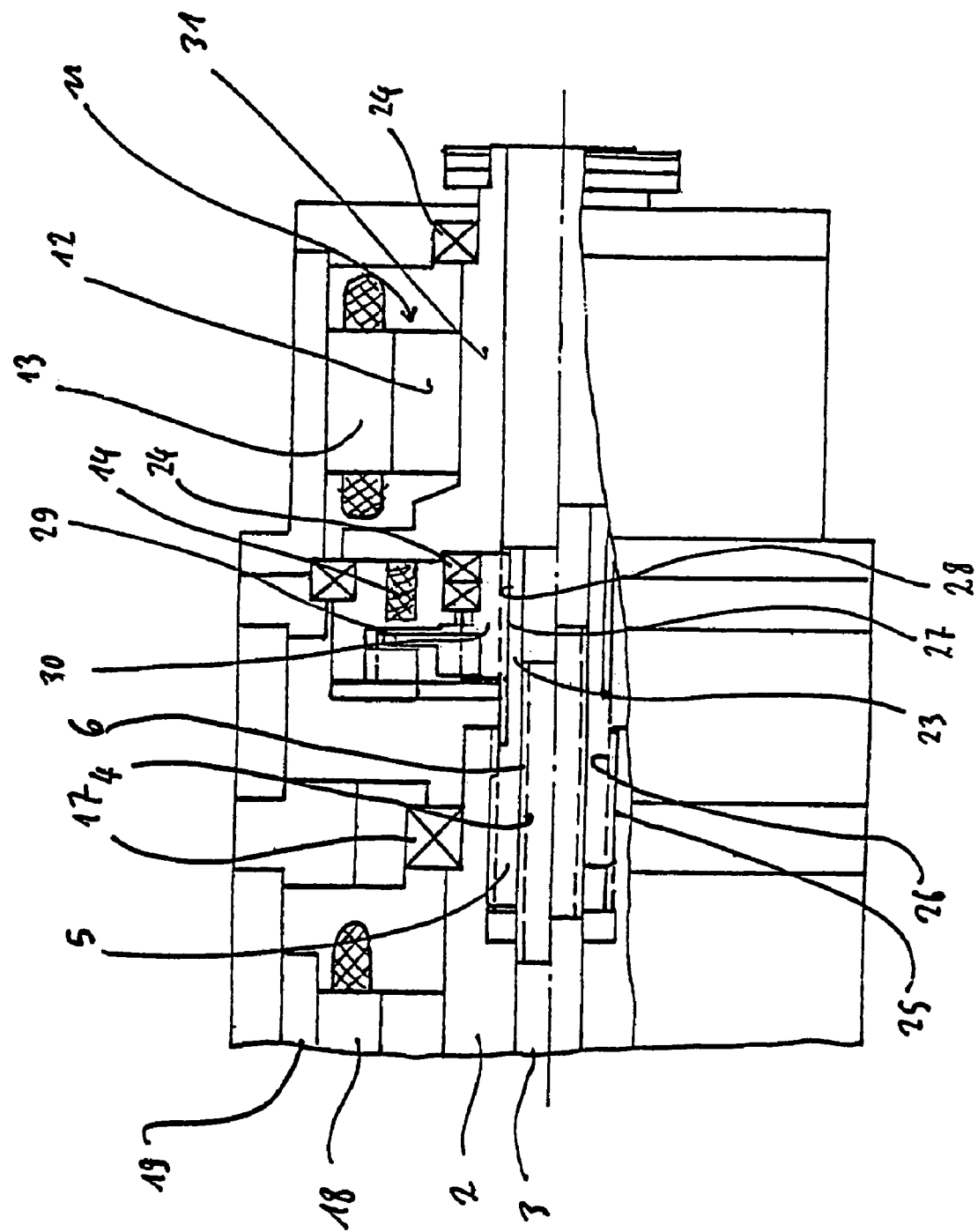
Figure 6:
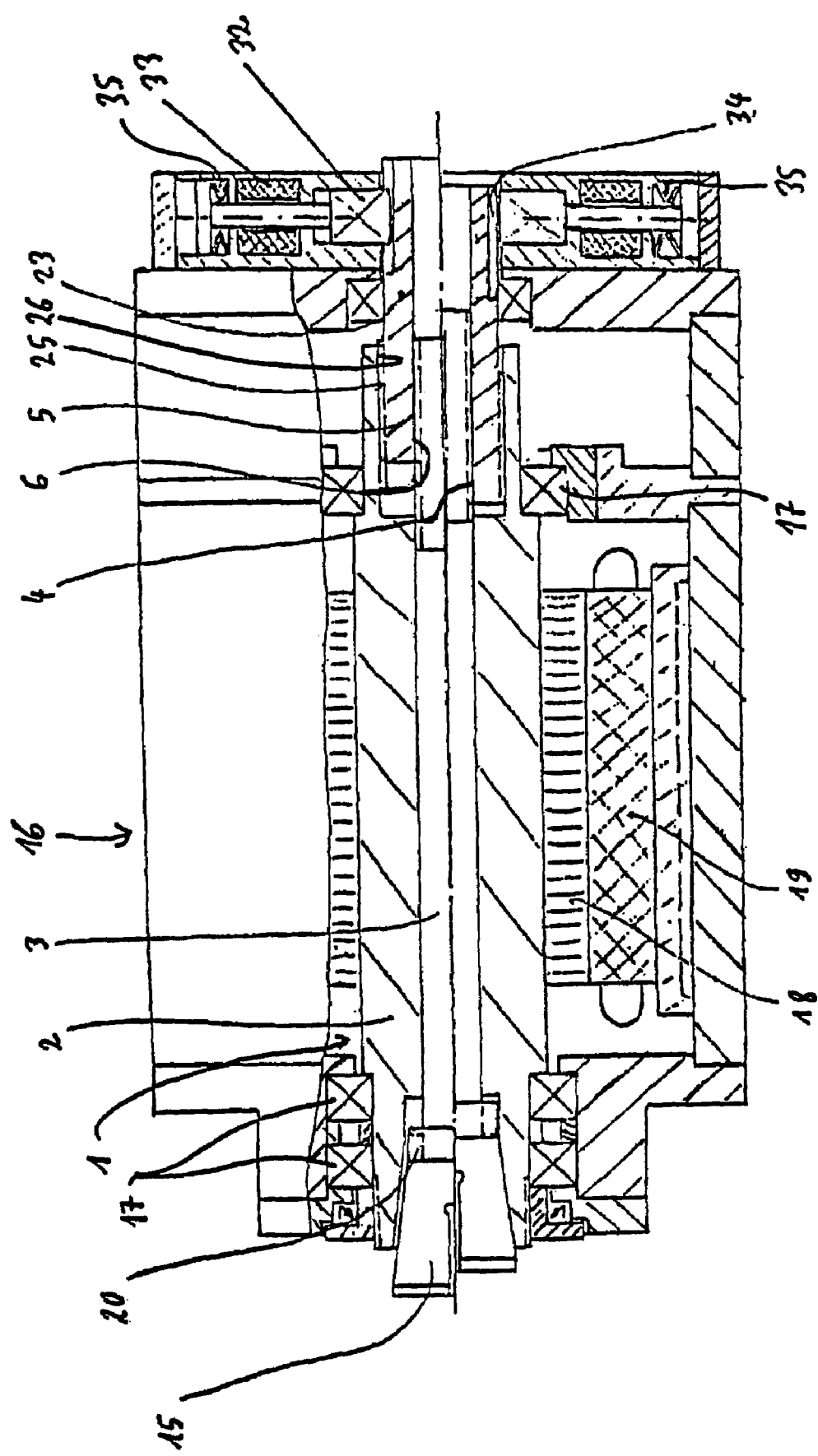

The invention is explained in more detail with reference to exemplary embodiments in the drawings, in which:

FIG. 1 shows a sectional illustration through a machine spindle with a first embodiment of the device, FIG. 2 shows a sectional illustration through a machine spindle with a further embodiment of the device, FIG. 3 shows a section through a machine spindle having a motor element with a displaceable rotor, FIG. 4 shows a section through a machine spindle with spring compensation, FIG. 5 shows a section through a machine spindle having a motor element with a clutch, and FIG. 6 shows a sectional illustration through a machine spindle with a further embodiment of the device.

FIG. 1 shows a device 1 having a shaft 2, a drawbar 3 and a chuck 15 known per se for accommodating a tool (not depicted) (e.g. a grinding wheel or a milling tool). Above the center line of FIG. 1, the drawbar 3 is depicted in its retracted position, displaced axially to the rear, with drawn-in (i.e. clamped) chuck 15. Below the center line, the drawbar 3 is displaced axially forward (to the left in the drawing), so that the tool can be removed and a new tool inserted.

In FIG. 1, the device 1 is integrated in a machine spindle 16, the shaft 2 being accommodated in the machine spindle 16 via bearings 17. The machine spindle 16 has a drive motor with a rotor 18 and a stator 19.

Provided on an extension 7 of the drawbar 3 is an external thread 4, on which a threaded body 5 having an internal thread 6 is screwed in place. The combination of external thread 4 and internal thread 6 used is designed in particular to be self-locking. When the threaded body 5 is rotated, the drawbar 3, which is mounted in a rotationally locked manner, for example via an anti-rotation locking means 20, and in such a way as to be only axially displaceable, is displaced in the axial direction and can be moved from the retracted end position depicted above the center line into the extended (open) end position depicted below the center line.

In this case, the threaded body 5 is accommodated in an axially fixed manner via axial bearings 21 and radial bearings 22. When the threaded body 5 is rotated relative to the drawbar 3, the threaded body 5 remains in its position relative to the device 1 and the machine spindle 16, whereas the drawbar 3—as described—moves axially.

The axial bearings 21 and radial bearings 22 of the threaded body 5 are accommodated in particular in a threaded bush 9, which is supported via a spring element 8 relative to the device 1 and in particular relative to the housing of the machine spindle 16, so that pressure is constantly applied to the threaded body 5 in order to be able to cushion, for example, settling forces introduced in the region of the chuck 15 or intermittent loads.

The threaded body 5 may also be used without spring element 8 and threaded bush 9.

According to FIG. 1, the external thread 4 of the drawbar 3 is provided in an extension 7 of the drawbar 3. The threaded body 5 has an extension 23 which merges into a hollow shaft 31 accommodated via bearings 24 and having the rotor 12 of a motor element 11. The motor element 11 also includes the stator 13. When the motor element 11 is activated, the threaded body 5 can be rotated as desired in order to produce the axial movement of the drawbar 3 for the tool change. When the motor element 11 is activated, the shaft 2 of the device 1 or of the machine spindle 16 is locked against rotation mechanically (e.g. via an anti-rotation locking means known per se, e.g. via a spline locking means) or by bearing control (already described) of the motor of the machine spindle 16.

During operation of the motor spindle 16 via its drive motor consisting of rotor 18 and stator 19, in addition to the shaft 2, the threaded body 5 and the rotor 12 of the motor element 11 rotate with it.

In the embodiment according to FIG. 2, the threaded body 5 has an external thread 25 which is accommodated in an internal thread 26 of the device 1 or of the shaft 2 (differential thread). When the threaded body 5 is rotated, the axial displacement of the drawbar 3 is selected by a combination of the selected thread combinations of external thread 25 and internal thread 26 and external thread 4 and internal thread 6. As a result, desired axial displacements can be selected as a function of the number of revolutions of the thread body 5.

The threaded body 5 is again connected via its extension 23 to the rotor 12 of the motor element 11. In contrast to the embodiment according to FIG. 1, the threaded body 5 is not accommodated in a stable position in the axial direction, but changes its axial position during its rotation together with the drawbar 3, although a relative movement between drawbar 3 and threaded body 5 also occurs here. Thus the threaded body 5 is located nearer to the chuck 15 in the retracted position of the drawbar 3 depicted above the center line according to FIG. 2 compared with the extended position of the chuck 15 below the center line according to FIG. 2. These positional displacements of the threaded body 5 can be made possible by an appropriate coupling 14 when the rotor 12 of the motor element 11 is arranged in a stable position in the axial direction. To realize the coupling 14, the extension 23 of the threaded body 5 may have an encircling multiple-spline profile 27 which is known per se and whose male splines engage in a corresponding multiple-spline profile 28 of a hollow shaft 31. The rotor 12 is provided on the hollow shaft 31. The multiple-spline profiles 27, 28 are in constant engagement, so that the rotary movement of the rotor 12 is transmitted to the threaded body 5.

FIG. 3 shows a rotor 12 of the motor element 11, this rotor 12 being attached to the extension 23 of the threaded body 5 and likewise being axially displaced during axial displacement of the threaded body 5 (in the embodiment having a differential thread according to FIG. 2). Due to the stator 13 of elongated design, the rotor 12 is located in the effective region of the stator 13 both in the one end position (above the center line according to FIG. 3) and in the other end position (below the center line according to FIG. 3) and can be actuated via said stator 13, so that rotation of the rotor 12 and thus of the threaded body 5 occurs.

In an analogous embodiment, the rotor 12 can be designed to be elongated relative to a shortened stator 13 (not depicted).

FIG. 4 shows an embodiment having multiple-spline profiles 27, 28 and having a differential thread, i.e. a thread combination of external thread 4 and internal thread 6 and external thread 25 and internal thread 26, the internal thread 26 of the device 1 again being accommodated in a threaded bush 9, to which pressure is applied in the axial direction via a spring element 8. As a result, the axial intermittent loads described (e.g. settling forces of the tool or intermittent shock forces during machining) can be cushioned via the spring element 8.

An embodiment having a differential thread can be seen in FIG. 5, in which embodiment the rotor 12 attached to a hollow shaft 31 is connected via multiple-spline profiles 27, 28 to the threaded body 5 via its extension 23 by a clutch 14 known per se and having a clutch disk 29 and a clutch hub 30. In this case, the clutch 14 is either an actuated clutch or a self-actuating clutch which engages and disengages as a function of speed. Furthermore, friction or positive-locking clutch models known per se may be used.

An especially advantageous embodiment of the device 1 according to the invention can be seen from FIG. 6. In this case, the device 1 is again integrated in a machine spindle 16. The drive, consisting of rotor 18 and stator 19, of the machine spindle 16 now serves, on the one hand, to drive the shaft 2 for producing the tool rotation when machine spindle 16 is operated. On the other hand, the drive of the machine spindle 16 serves for the rotary adjustment of the threaded body 5, which is designed as a differential thread in a manner described in principle and is guided in a rotatable manner within the internal thread 26 of the shaft 2 via its external thread 25. The drawbar 3 is in this case accommodated via its external thread 4 in the internal thread 6 of the threaded body 5.

By rotation of the shaft 2, the threaded body 5 locked in a stable rotary position is displaced axially. For the rotary stabilization, the threaded body 5 may have a multiple-spline profile 34, in which a correspondingly shaped piston 32 engages by actuation via a magnet coil 33. During the rotation of the threaded body 5, the drawbar 3 accommodated in the threaded body 5 is displaced. The drawbar 3 can therefore be brought from an extended position (above the center line) into a retracted position (below the center line) and back for the tool change. After completion of the tool change, the piston 32 is released again by spring force of the spring element 35, and the rotary connection between shaft 2 and drawbar 3 is restored. After that, the machine spindle 16 can be operated again, and the rotation of the shaft 2 is transmitted to the tool accommodated in the chuck 15 of the machine spindle 16.

When machine spindle 16 is operated, the threaded body 5 rotates together with the drawbar 3 in an axially fixed position inside the shaft 2.

DESIGNATIONS

1 Device
2 Shaft
3 Drawbar
4 External thread
5 Threaded body
6 Internal thread
7 Extension
8 Spring element
9 Threaded bush
11 Motor element
12 Rotor
13 Stator
14 Coupling/clutch
15 Chuck
16 Machine spindle
17 Bearing
18 Rotor
19 Stator
20 Anti-rotation locking means
21 Axial bearing
22 Radial bearing
23 Extension
24 Bearing
25 External thread
26 Internal thread
27 Multiple-spline profile
28 Multiple-spline profile
29 Clutch disk
30 Clutch hub
31 Hollow shaft
32 Piston
33 Magnet coil
34 Multiple-spline profile
35 Spring element

The invention claimed is:

1. A device for fastening a tool to a shaft, having a drawbar with a longitudinal axis, which drawbar is axially displaceable in the shaft and is intended for releasably locking a tool fastened to the shaft, for an automatic tool change in machine tools, characterized in that the drawbar (3) is accommodated in the shaft (2) in a rotationally locked manner and has an external thread (4), a threaded body (5) having a corresponding internal thread (6) being provided on the external thread (4) and also having an external thread (25) which is accommodated in a corresponding internal thread (26) of the device (1), and the drawbar (3), for the tool change, being axially displaceable by rotating the threaded body (5) inside the shaft (2).

2. The device as claimed in claim 1, wherein the drawbar (3) has an extension (7) for providing the external thread (4) thereof.

3. The device as claimed in claim 1, wherein a spring element (8) is provided for applying pressure to the drawbar (3) in the axial direction.

4. The device as claimed in claim 1, wherein the threaded body (5) has an encircling multiple-spline profile (27).

5. The device as claimed in claim 1, wherein the threaded body (5) can be rotated in a motor-operated manner.

6. The device as claimed in claim 5, wherein a motor element (11) is provided for the motor-operated rotation of the threaded body (5).

7. The device as claimed in claim 6, wherein the motor element (11) has a rotor (12) attached to an extension (23) of the threaded body (5).

8. The device as claimed in claim 7, wherein the rotor (12) is designed to be axially displaceable and can be activated in both its front and rear axial positions via a stator (13).

9. The device as claimed in claim 6, wherein the motor element (11) is connected to the threaded body (5) via a coupling (14).

10. The device as claimed in claim 9, wherein the coupling (14) is a fixed coupling.

11. The device as claimed in claim 9, wherein the coupling (14) is a clutch.

12. The device as claimed in claim 1, wherein the device (1) is accommodated in a machine spindle (16).

13. The device as claimed in claim 12, wherein the drive of the machine spindle (16) serves to rotate the threaded body (5).

14. The device as claimed in claim 1, wherein an anti-rotation lock is provided for fixing the drawbar (3).

15. The device as claimed in claim 14, wherein the drawbar (3) has at least one female spline for accommodating the anti-rotation lock.

16. A machine spindle (16) having a device for fastening a tool to a shaft (2) as claimed in claim 1.

* * * * *